United States Patent Office 2,945,065
Patented July 12, 1960

2,945,065

PROCESS FOR THE REDUCTION OF NITROCYCLOHEXANE TO CYCLOHEXANONE OXIME

Lorraine Guy Donaruma, Media, Pa., assignor to E. I. du Pont de Nemours and Company, Wilmington, Del., a corporation of Delaware No Drawing. Filed July 30, 1958, Ser. No. 751,819

7 Claims. (Cl. 260—566)

The present invention relates to the production of oximes. More particularly, the present invention relates to an economical process for obtaining cyclohexanone oxime.

Cyclohexanone oxime, which finds its primary use as a precursor for the polyamide intermediate, ε-caprolactam, is most often prepared by the reaction of cyclohexanone, nitrocyclohexane, or a nitrocyclohexane salt with an aqueous acidic solution of a hydroxylamine salt. However, the hydroxylamine salts are expensive. Because of increased use of the polymers obtained from caprolactam in a variety of applications, improved, cheaper methods of obtaining the intermediate cyclohexanone oxime are needed.

Accordingly, an object of the present invention is to provide an economical process for obtaining cyclohexanone oxime.

Another object of the present invention is to provide an improved process for the preparation of lactam intermediates wherein cheap, readily available reagents can be used.

Other objects will become apparent from the following detailed description of the invention.

I have found that the foregoing objects may be achieved when nitrocyclohexane is caused to react with carbon monoxide and a lower alkanol in the presence of a base under conditions of elevated temperature and pressure.

In accordance with the process of the present invention, nitrocyclohexane is caused to react with carbon monoxide and a lower alkanol, e.g., methanol or ethanol, in the presence of a base at temperatures between about 150 and about 200° C. and pressures between about 500 and about 900 p.s.i.ga. An alkaline salt of the nitrocyclohexane, e.g., the sodium, potassium, or ammonium salt, preferably is used as the starting material in the present process.

The present process is illustrated by the following examples, but the invention is not to be construed as limited to the specific techniques shown therein. The parts in the examples are parts by weight, and the yields reported express the relationship between the moles of product cyclohexanone oxime obtained and the moles of salt of nitrocyclohexane introduced less the moles of salt of nitrocyclohexane recovered.

*Example 1*

Seventeen parts of the potassium salt of nitrocyclohexane dissolved in 50 parts of anhydrous methanol was charged to a stainless steel bomb provided with a "Pyrex" (registered trademark of Corning Glass Works) glass liner. The bomb was pressurized to 390 p.s.i.ga. with carbon monoxide and then to 600 p.s.i.ga. with hydrogen. Agitation was started and the mixture heated to 180° C. The mixture was maintained at 180–190° C. for 3 hours. At the end of this period and at the reaction temperature, the pressure was 440 p.s.i.ga., and the bomb was cooled and vented. The bomb contents were removed and the solvent removed therefrom by distillation under reduced pressure. Water was added to the distillation residue and the pH adjusted to 5. The mixture was extracted with ether, the ether extract dried, and the solvent partially removed from the dried extract by distillation. The residue was extracted with 20% sulfuric acid, and the pH of the acid extract was adjusted to 5. The ether extraction and solvent removal procedures were repeated. The distillation residue was crystalline cyclohexanone oxime which was obtained in a yield of 70%.

*Example 2*

The general procedure of Example 1 was used in the following runs:

| NCH[a] Salt | parts | Alkanol | parts | Pressure (p.s.i.ga.) | | | | | Reaction Time (hrs.) | Yield of cyclohexanone oxime (percent) |
|---|---|---|---|---|---|---|---|---|---|---|
| | | | | Initial Partial Pressure of CO | Diluent Gas | Initial Total Pressure | Final Pressure | Final Temp. (° C.) | | |
| Na | 15.1 | $CH_3OH$ | 50 | 380 | $H_2$ | 700 | [b] 718 | 180–190 | 2.5 | 43 |
| K | 17 | $C_2H_5OH$ | 20 | 600 | | 600 | [c] 620 | 180–200 | 2.5 | 65 |
| K | 51 | $CH_3OH$ | 1600 | 250 | $N_2$ | 600 | [d] | 180–190 | 2 | 46 |

[a] NCH–nitrocyclohexane.
[b] Max. pressure attained during run was 760 p.s.i.ga.
[c] Max. pressure attained during run was 800 p.s.i.ga.
[d] Not recorded.

The present process provides an inexpensive method of converting nitrocyclohexane to cyclohexanone oxime, a valuable polymer precursor. As was stated in the foregoing, the nitrocyclohexane preferably is used in the form of an alkaline salt. By alkaline salt in the present specification and claims is meant the alkali-metal salts, particularly the potassium and sodium salts illustrated in the examples, and the ammonium salt. All of these salts are readily prepared by techniques well known in the art.

In the embodiments shown in the examples, the nitrocyclohexane salt is caused to react with methanol or ethanol and carbon monoxide. However, depending on economic considerations, I can use other alkanols such as isopropanol, butanol, and the like. Alkanols containing one to four carbon atoms are generally to be preferred in the present process.

As is illustrated in the examples, the pressure required for the process of the invention may be achieved with the carbon monoxide alone or with a mixture of carbon monoxide with an inert diluent gas such as hydrogen or nitrogen. By inert diluent gas is meant a gaseous substance which is inert to all the reaction components under the conditions of the reaction.

The total pressure used in the present process may vary between about 500 and about 900 p.s.i.ga. Pressures much below this range are operable but give very low yields of the oxime in reasonable periods of time. Higher pressures are unnecessary with respect to the yields obtained and require excessively expensive equipment. The preferred initial total pressure in the present process is between about 600 and about 800 p.s.i.ga.

My present process can be operated at temperatures between about 150 and about 200° C. Below about 150° C., the reaction is slow. Excessive decomposition occurs at temperatures much above 200° C. A number of experiments on the present process, including those of the foregoing examples, have indicated that the best yields may be obtained when the temperature is maintained between about 180 and about 200° C. I have found that temperature control is simplified and, hence, that decomposition is minimized, by preheating to the reaction temperature a mixture of the alkanol and carbon monoxide or carbon monoxide-diluent gas introduced under pressure and then adding to the hot mixture a solution of the nitrocyclohexane salt in the alkanol.

While I do not wish to be limited by any theoretical discussions, I believe that the alkyl cyclohexanenitronate corresponding to the alkanol used may be an intermediate to the cyclohexanone oxime obtained by the process of the present invention. Thus, the present process may be illustrated by the equation:

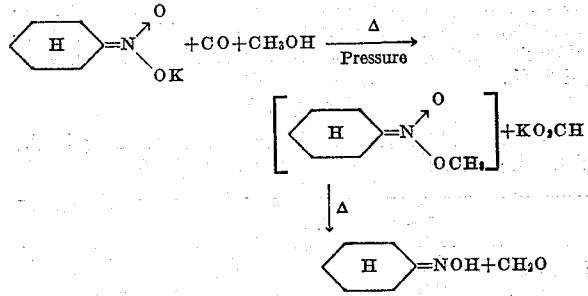

Although, as the foregoing equation indicates, only equimolar amounts of the nitrocyclohexane salt, the carbon monoxide, and the alkanol are theoretically required in the present process, it is preferable to use an excess of both the latter two reactants. Temperature control, reaction rate, and the like are facilitated by the use of sufficient alkanol to act not only as a reactant but also as medium for the reactants and product. Likewise, an excess of the gaseous carbon monoxide or carbon monoxide-diluent mixture facilitates agitation and intimate mixing of the reactants.

Depending generally on the reaction conditions chosen, the reaction in the present process may be complete within a period of between about two and about six hours.

I have illustrated the applicability of the present process to nitrocyclohexane. However, other nitro cycloalkanes such as nitrocyclopentane and secondary nitro alkanes such as 2-nitropropane also could be used.

The oxime obtained by the present process is readily converted to caprolactam by the Beckmann rearrangement, for which many variations and techniques are well known in the art. The oxime also is useful as an insecticide, as a solvent, and as a chemical intermediate.

The present process has been described in detail in the foregoing, but many variations will be apparent to those skilled in the art. Hence, I intend to be limited only by the following claims.

I claim:

1. A process for the production of cyclohexanone oxime which comprises reacting an alkaline salt of nitrocylcohexane with at least equimolar amounts of carbon monoxide and an alkanol containing one to four carbon atoms at temperatures between about 150 and about 200° C. and pressures between about 500 and about 900 p.s.i.ga.

2. The process as claimed in claim 1, wherein the alkaline salt of nitrocyclohexane is the sodium salt.

3. The process as claimed in claim 1, wherein the alkaline salt of nitrocyclohexane is the potassium salt.

4. The process as claimed in claim 1, wherein the alkanol is methanol.

5. The process as claimed in claim 1, wherein the alkanol is ethanol.

6. A process for the production of cyclohexanone oxime which comprises reacting an alkaline salt of nitrocyclohexane with at least equimolar amounts of carbon monoxide and an alkanol containing one to four carbon atoms at temperatures between about 180 and about 200° C. and pressures between about 600 and about 800 p.s.i.ga.

7. The process as claimed in claim 6, wherein the carbon monoxide is mixed with an inert diluent gas selected from the group consisting of hydrogen and nitrogen.

References Cited in the file of this patent

UNITED STATES PATENTS

| 2,638,482 | Grundmann | May 12, 1953 |
| 2,702,301 | Schichkh | Feb. 15, 1955 |
| 2,711,427 | Christian | June 21, 1955 |
| 2,763,686 | Donaruma | Sept. 18, 1956 |

FOREIGN PATENTS

| 877,303 | Germany | May 21, 1953 |